United States Patent [19]
Jeltsch et al.

[11] Patent Number: 5,867,909
[45] Date of Patent: Feb. 9, 1999

[54] BRANCH SHEARS TOOL

[75] Inventors: Thomas Jeltsch, Markdorf; Jorn Lutzeler, Daisendorf, both of Germany

[73] Assignee: J. Wagner GmbH, Friedrichshafen, Germany

[21] Appl. No.: 842,002

[22] Filed: Apr. 23, 1997

[30] Foreign Application Priority Data

Apr. 27, 1996 [DE] Germany ................. 196 16 949.6

[51] Int. Cl.⁶ ................................................. B26B 15/00
[52] U.S. Cl. ................................................. 30/228; 30/216
[58] Field of Search .................... 30/228, 216, 210; 81/57.42, 301; 254/424, 425, DIG. 2; 72/454, 21.3

[56] References Cited

U.S. PATENT DOCUMENTS

| | | | |
|---|---|---|---|
| 1,642,259 | 9/1927 | Morse . | |
| 1,662,473 | 3/1928 | Ralston . | |
| 1,786,625 | 12/1930 | Lindstrom . | |
| 2,075,341 | 3/1937 | Goodman | 20/11 |
| 2,286,552 | 6/1942 | Klose | 30/228 |
| 2,705,858 | 4/1955 | Marsh | 56/25 |
| 3,178,816 | 4/1965 | Schmid | 30/228 |
| 3,199,193 | 8/1965 | Norty | 30/228 |
| 3,408,875 | 11/1968 | Briskman | 74/48 |
| 3,536,976 | 10/1970 | Briskman | 318/443 |
| 3,583,067 | 6/1971 | Briskman | 30/228 |
| 3,693,254 | 9/1972 | Salonen | 30/228 |
| 3,768,088 | 10/1973 | Risius | 254/424 X |
| 4,359,821 | 11/1982 | Pellenc | 30/228 |
| 4,682,416 | 7/1987 | Stolfa | 30/228 |
| 4,967,474 | 11/1990 | Wells | 30/228 |
| 5,642,566 | 7/1997 | Hirabayashi | 30/228 |

FOREIGN PATENT DOCUMENTS

| | | | |
|---|---|---|---|
| 0 118 350 | 9/1984 | European Pat. Off. | B26B 15/00 |
| 0 291 431 | 11/1988 | European Pat. Off. | A01G 3/03 |
| 94 01 672 | of 1994 | European Pat. Off. | A01G 3/03 |
| 2 635 435 | of 1990 | France | A01G 3/02 |

Primary Examiner—Douglas D. Watts
Attorney, Agent, or Firm—Faegre & Benson LLP

[57] ABSTRACT

Branch shears (1) having two blades (11, 12) that are movable in relation to each other, of which one blade (11) is rigidly connected with a housing (2) and the other blade (12) can be moved by an electric motor (5) via a threaded spindle (8), a threaded nut (21) arranged on the threaded spindle and a rod assembly connected to the threaded nut. A control switch (41) having two reversing switches (42, 43) connected to the circuit of the electric motor (5) is provided. In addition, a control link (51) is attached to the spindle nut (21), onto which the operating cams (53, 54, 55) interacting with the reversing switches (42, 43) are formed. With the aid of the control switch (41), it is possible to stop, continue or reverse the movements of the pivotable blade (12) at any time in a simple manner, thus the movements of this blade can be controlled as desired. In addition, it is ensured that the branch shears (1) will always open automatically by the force of the electric motor (5) if the control switch is released.

10 Claims, 7 Drawing Sheets

BRANCH SHEARS TOOL

BACKGROUND OF THE INVENTION

The invention relates to a branch shears tool or the like in particular, having two blades that are movable in relation to each other, of which one blade is rigidly connected with a housing and the other blade can be moved by an electric motor arranged in the housing via a threaded spindle capable of being rotated by said electric motor, a threaded nut located on the threaded spindle and supported so as to be non-rotating and a rod assembly connected to the threaded nut.

EP 0 291 431-A1 discloses branch shears of this class. In this case, the translational motions of the spindle nut are limited by an electrical or electronic stopping device that directly or indirectly acts on the electric motor. In addition, the actuating mechanism is fixedly connected with the threaded spindle and consequently follows its feed motions so that the actuating mechanism assumes different operating positions. The electrical control arrangement also has a movable magnetic control rod which is acted upon by the actuating mechanism as well as a fixedly attached sensor in the vicinity of the magnetic control rod. Aside from the considerable constructional expense required by this embodiment, the changing positions of the actuating mechanism do not allow easy handling.

In addition, EP 0 118 350-A1 discloses garden shears in which the movable blade has a drive connection with a disk arranged on the shaft driven by the drive motor. In order to switch off the electric motor with the cutting blades in open position, the disk is provided with an operating cam; in addition, a double-throw switch is installed in the housing, the switch being actuated by the pivotable blade so that a reverse rotation of the electric motor is immediately initiated when the shears are closed. Thus the blades are unable to assume any intermediate positions, but rather the blades are closed by the force of the drive motor and opened by the force of a spring. Also, the force of the return spring must always be overcome during a cutting operation and it must be tensioned; the drive motor must therefore be provided with sufficient power. Aside from the fact that the return spring is a part subject to wear and can break, its force is occasionally not sufficient to open the shears, particularly when relatively thick branches are to be cut. Thus the actuating and transferring mechanisms provided in these shears do not permit optimal handling.

OBJECT OF THE INVENTION

The object of the invention is therefore to be able to control the electric motor in the tool of the above-cited class in such a way that the movement of the movable blade can be stopped in any open position and can also be reversed if necessary. Consequently, it should be possible to control the movement of the movable blade as desired, so that an adaptation to the cutting operations to be carried out can be made at any time. In addition, the force of the drive motor should be fully utilizable both in a cutting operation as well as in opening the shears, so that malfunctions are nearly excluded even when severing relatively thick branches. Working with such a tool should be facilitated by a simple structural design and easy handling.

SUMMARY OF THE INVENTION

In accordance with the invention, this is attained in a tool, branch shears of the above-cited design in particular, by the provision of a control switch that can be rocked on an axis in the housing running perpendicular to the threaded spindle or supported in the longitudinal direction of the housing with limited sliding motion for the controlled operation of the electric motor, said control switch having two reversing switches arranged at a lateral distance from each other and connected to the circuit of the electric motor. And a control link is attached to the spindle nut, onto which the operating cams interacting with the actuating elements of the reversing switch are formed.

In this case, it is expedient if the control switch can be moved automatically into switching positions against the force of a spring.

According to a preferred embodiment, the control link attached to the spindle nut can be formed by a rail projecting parallel to the axis of the threaded spindle into which a recess which is open in the direction of the rocking control switch and preferably has walls sloping toward each other is formed as an operating cam, whereby the lateral distance between the two actuating elements should be dimensioned to be greater than the length of the recess provided in the rail and the spring acting on the rocking control switch should be located at a distance from the pin carrying the switch and should be supported against the housing.

According to a different embodiment, the control link attached to the spindle nut may be comprised of a skid having bevels in both end areas sloping in the direction of the control switch and with them forming the operating cam. In this case also, the distance between the two actuating elements of the reversing switch should be dimensioned to be larger than the effective length of the skid and the spring acting on the slideable control switch should be aligned in the direction of motion of said switch and be supported against the housing.

To further increase operating safety, it is of advantage to lock the control switch in one switching position, preferably in the switching position with the blades in their closed position by connecting it to a stud attached to the housing by means of a slide or the like.

If a tool, branch shears in particular, is designed in accordance with the invention, with the aid of the control switch, it is possible to stop, continue or reverse the motion of the pivotable blade at any time in a simple manner, thus the movements of this blade can be controlled as desired. In addition, it is ensured that the branch shears will always open automatically by the force of the electric motor if the control switch is released, consequently resulting in a reduced risk of accidents and it is nearly impossible for the blade to become caught in a branch and for the shears not to open.

The constructional expense required to bring this about is extremely low, since only a rocking or sliding control switch equipped with reversing switches is provided as well as a control link to initiate the movements desired at any time. Thus incorrect operation is reliably avoided with easy handling of the control switch. Also, the branch shears designed in accordance with the proposed invention have a high level of operating safety

BRIEF DESCRIPTION OF THE DRAWINGS

An exemplary embodiment of the branch shears in accordance with the invention will now be described in greater detail below with reference to the accompanying drawings.

DETAILED DESCRIPTION

Figure 1:
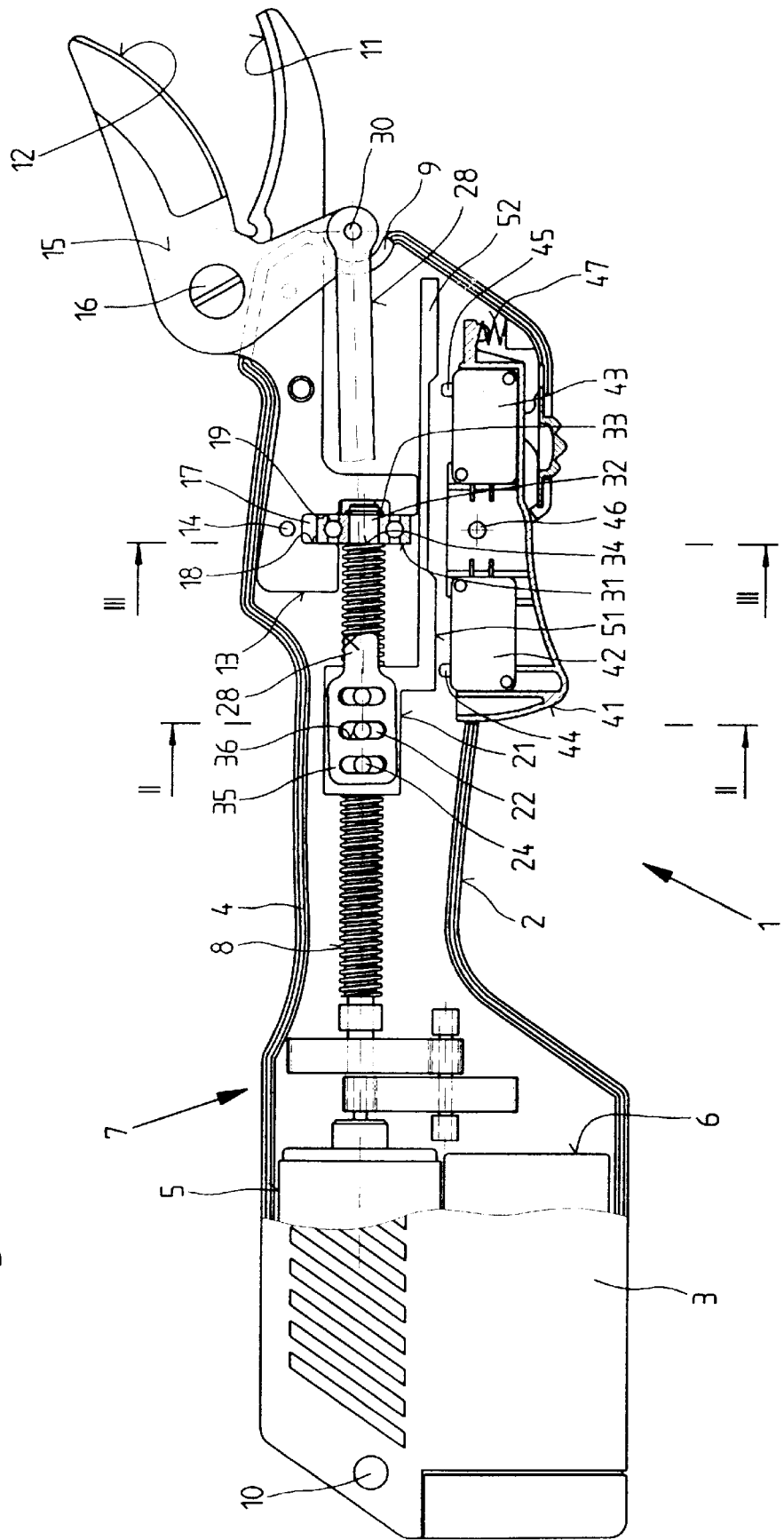
FIG. 1 shows the branch shears, partially in axial section and partially in plan view.

The branch shears shown in FIG. 1 and identified as 1 are essentially comprised of two blades 11 and 12 which are movable in relation to each other and projecting out of a double shelled housing 2; of said blades, blade 11 is rigidly connected to the housing 2 and blade 12 is pivotable by means of an electric motor 5. For this purpose, the electric motor 5, which is powered by a battery 6, has a drive connection with blade 12 via a reduction gear 7, a threaded spindle 8 as well as a spindle nut 21 which can be displaced by said threaded spindle and a rod assembly comprised of levers 28 and 29.

Housing 2 is comprised of two plastic shells 3 and 4 which are provided with an opening 9 on the end opposite the electric motor 5, through which the blades 11 and 12 protrude. The half-shells 3 and 4 are fixedly connected by means of screws 10.

In order to be able to absorb the forces occurring during a cutting operation within the components involved so that these forces are not transferred to housing 2, blade 11 is provided with an extension 13 projecting in the direction of threaded spindle 8, said extension being fixed to half shell 4 by means of screws penetrating through drilled holes 14. In addition, extension 13 has a bearing axis 15 in which blade 12 is held pivotably by means of a bolt 16. Furthermore, a recess 17 is formed into extension 13 in the area of threaded spindle 8 and a rolling bearing 31 is disposed on threaded spindle 8 and axially supported in recess 17 so that the rolling bearing cannot be moved in an axial direction. In addition, threaded spindle 8 is provided with a stepped pin 32 on which the rolling bearing 31 is placed. Rolling bearing 31 is fixed to threaded spindle 8 by means of a snap ring 33 held in pin 32 on the one hand and by a stopping face 34 formed onto threaded spindle 8; in addition, the opposite facing surfaces of recess 17 are formed as bearing surfaces 18 and 19 for rolling bearing 31. Forces acting upon threaded spindle 8 can thus be transferred to extension 13 via rolling bearing 31.

Figure 2:
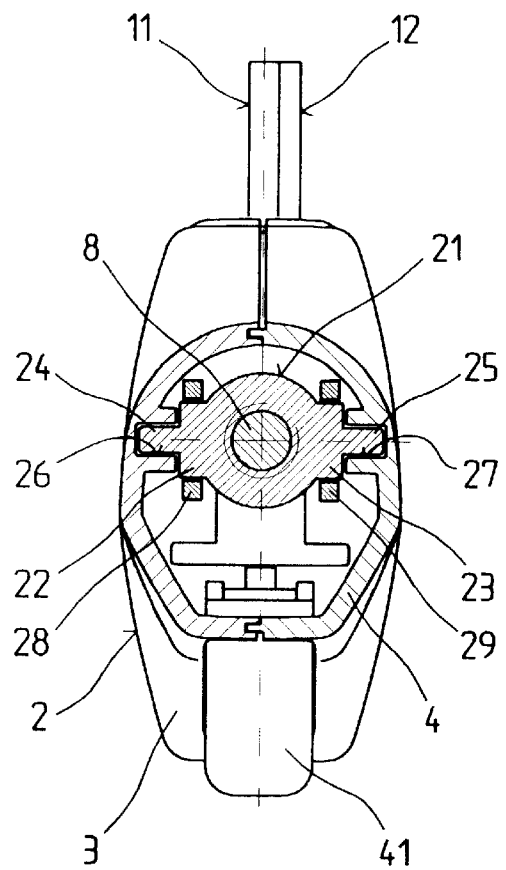
FIG. 2 shows a section according to Line II—II of FIG. 1.
Figure 3:
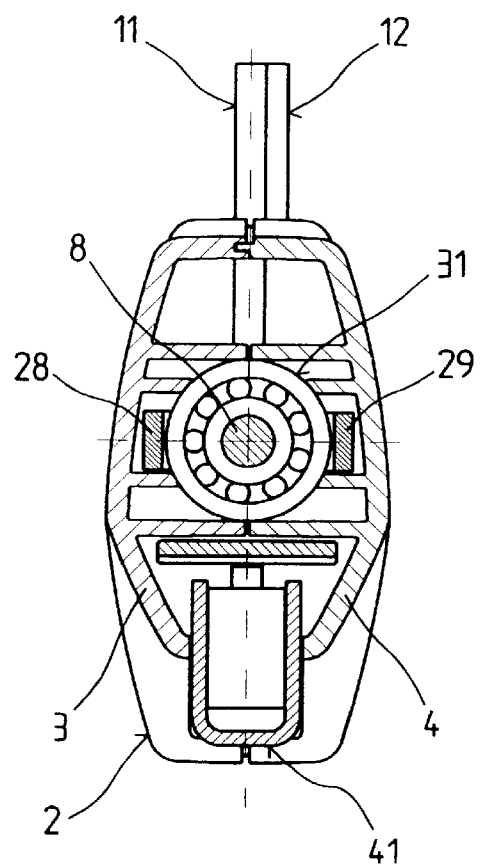
FIG. 3 shows a section according to Line III—III of FIG. 1.

As can especially be seen in FIG. 2, threaded nut 21 can be guided non-rotatingly but moved in an axial direction by means of two studs 24 and 25 projecting laterally into grooves 26 and 27 formed into half-shells 3 and 4 of housing 2. In the exemplary embodiment shown, studs 24 and 25 project past projections 22 and 23, respectively, to which levers 28 and 29 are coupled at one end, said levers being formed for this purpose as brackets 35 with recesses 36 to contain projections 22 and 23. At the other end, levers 28 and 29 have a drive connection with movable blade 12 by means of a joint pin 30.

If electric motor 5 is switched on by means of a control switch 41 and threaded spindle 8 is rotated by the motor such that threaded nut 21 is moved to the left, blade 12 is then pivoted on bolt 16 via levers 28 and 29 which have a drive connection with the threaded nut so that a branch found between blades 11 and 12 is sheared off. A reversal of the direction of rotation of electric motor 5 again returns blades 11 and 12 into the operating position shown.

If a part is severed with branch shears 1, then the threaded nut 21 must be displaced to the left by threaded spindle 8 driven by electric motor 5 in order to move blade 12 in the direction of the fixed blade 11. The tensile force occurring as a result is absorbed by bearing surface 19 via rolling bearing 31. However, at the same time, an opposite force initiated by the pivoting of blade 12 and transferred to extension 13 via bolt 16 acts upon extension 13. And since these forces are of nearly equal magnitude but are directed toward each other from opposite directions, the result is a closed power flux so that housing 2 is nearly free of strains caused by a cutting operation.

As can especially be seen in FIG. 1 as well as FIGS. 4 to 9, control switch 41 has two reversing switches 42 and 43, the actuating elements 44 and 45 of which interact with a control link 51 which is attached to threaded nut 21. Control link 51 is formed by a rail 52 running parallel to threaded spindle 8, said rail having a recess 53 formed into it which is open in the direction of control switch 41 and whose side walls 54 and 55 are inclined toward each other. By means of a pin 46, the control switch 41 can be rocked in housing 2 on an axis aligned perpendicular to threaded spindle 8 against the force of a spring 47 which is supported against housing 2 so that the electric motor 5 can be selectively controlled by means of reversing switches 42 and 43 in interaction with link 51.

Figure 4:
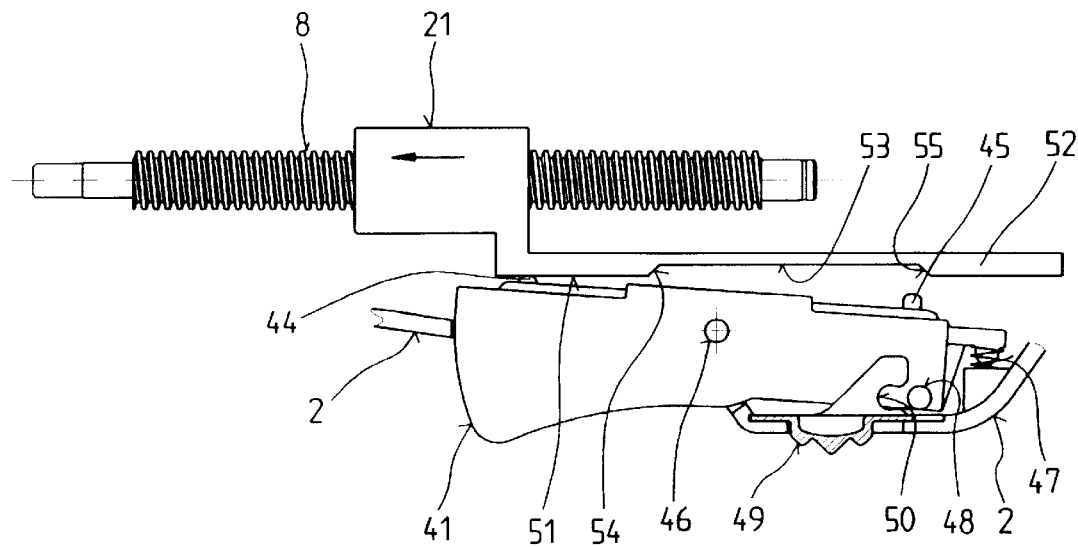
FIG. 4 shows the control switch in the branch shears according to FIG. 1 in a simplified representation of a first switching position.

FIG. 1 shows control switch 41 in a neutral position. If, starting from this neutral position, as shown in FIG. 4, hand pressure is applied to control switch 41 and the latter is rocked on pin 46, electric motor 5 is then rotated by means of reversing switch 42 as a result of its actuating element 44 being actuated such that threaded nut 21, and consequently also levers 28, 29, are displaced to the left and blade 12 is pivoted in the direction of blade 11.

Figure 5:
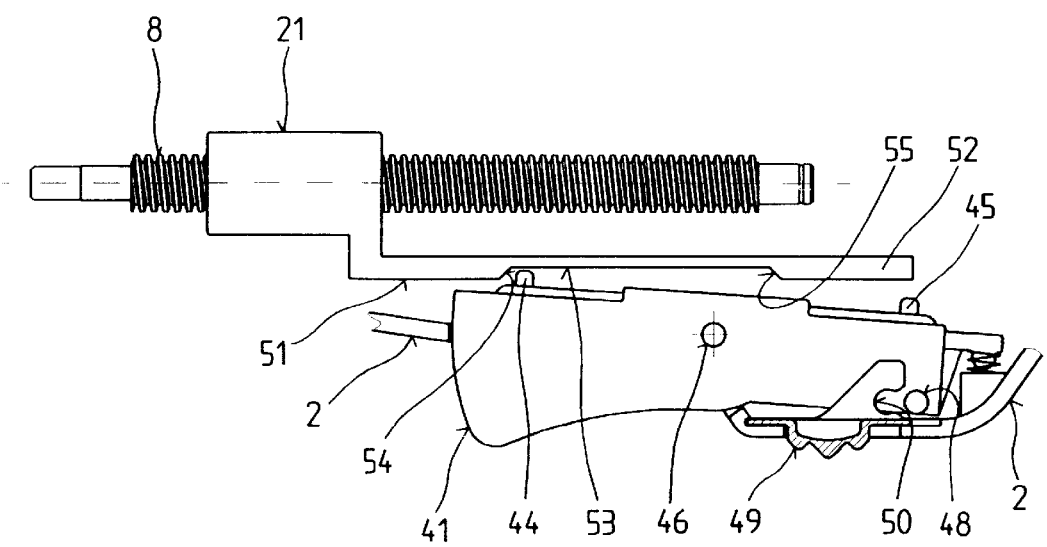
FIG. 5 shows the control switch in the branch shears according to FIG. 1 in a simplified representation of a second switching position.
Figure 6:
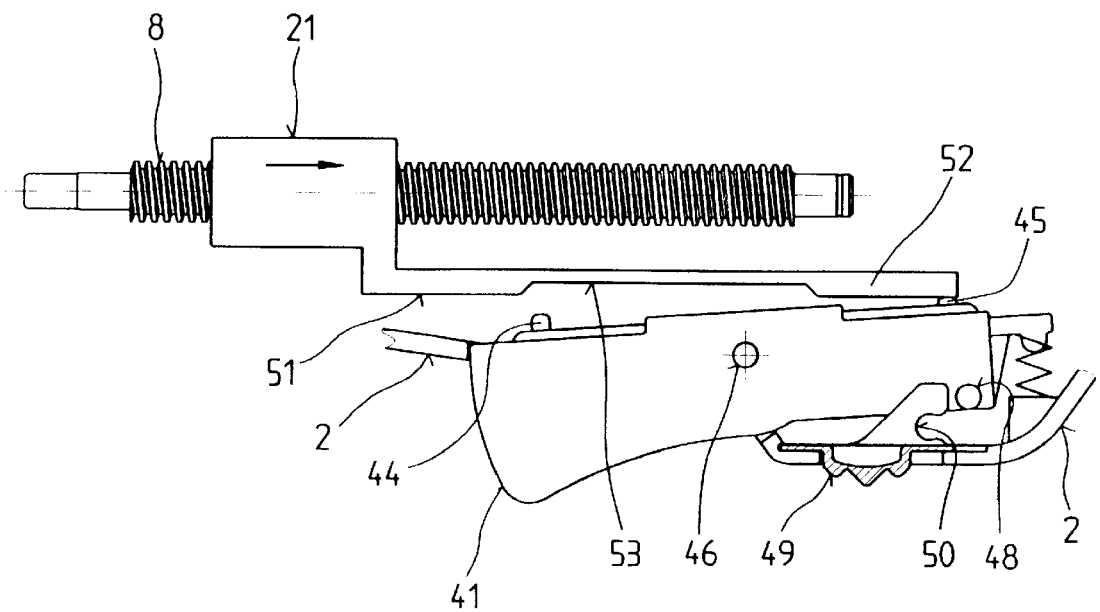
FIG. 6 shows the control switch in the branch shears according to FIG. 1 in a simplified representation of a third switching position.
Figure 7:
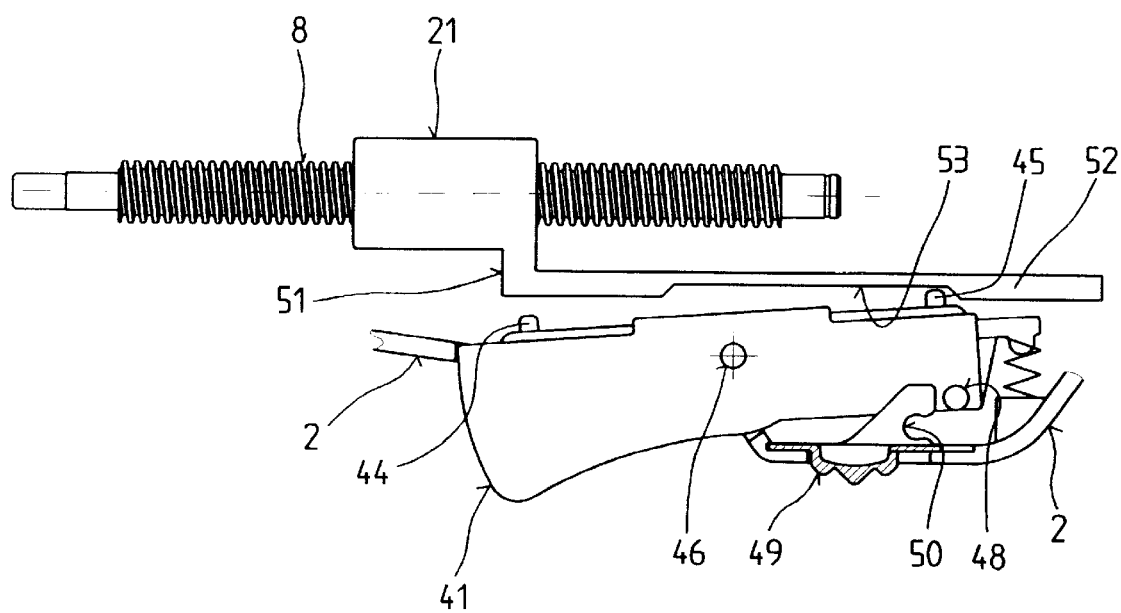
FIG. 7 shows the control switch in the branch shears according to FIG. 1 in a simplified representation of a fourth switching position.

However, control link 51 and thus also rail 52 are also displaced to the left together with threaded nut 21. As soon as control link 51 reaches a certain position, as shown in FIG. 5, actuating element 44 of reversing switch 42 is introduced into recess 53 via end face 54 of recess 53 so that reversing switch 42 is no longer actuated and electric motor 5 is switched off automatically. The cutting operation is thus completed and cutting shears 1 are closed.

Figure 8:
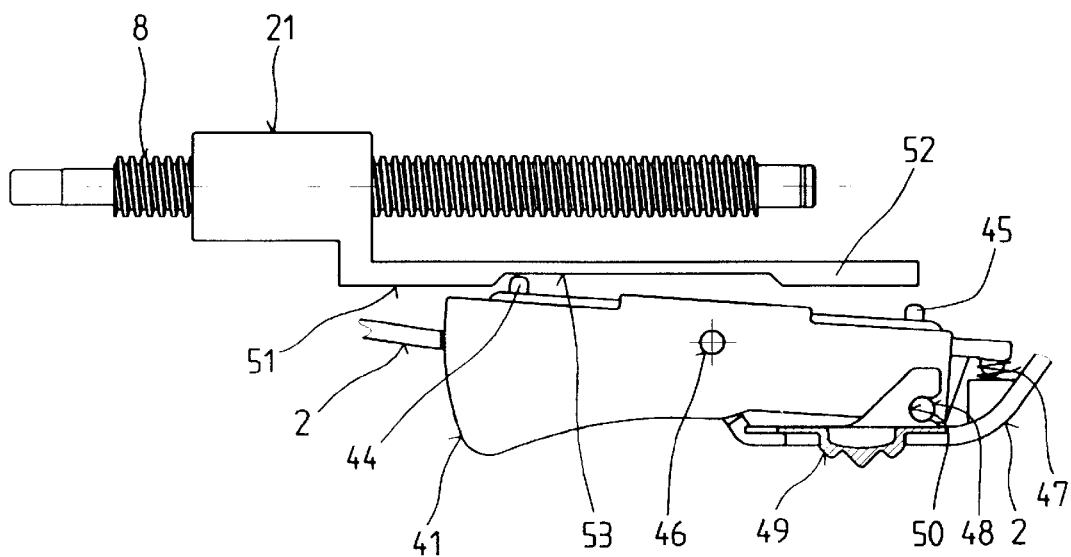
FIG. 8 shows the control switch in the branch shears according to FIG. 1 in a simplified representation of a fifth switching position.

According to FIG. 8, control switch 41 can be stopped in this operating position and cutting shears 1 can consequently be held closed. This is brought about by an open recess 50 assigned to a stud attached to control switch 41. If slide 49 is moved as shown in FIG. 8, the double-throw switch 41 is connected with stud 48 by means of slide 49 and is consequently locked to housing 2.

When control switch 41 was operated, spring 47 supported between said switch and housing 2 was compressed. If, starting from the operating position shown in FIG. 5, control switch 41 is released or if slide 49 is pushed back to the left, control switch 41 is automatically rocked on pin 46 by the force of compressed spring 47 into the position shown in FIG. 6. This means that since its actuating element is in contact with control link 51, reversing switch 43 is connected to the circuit of electric motor 5 thus reversing its polarity. In this switching position of control switch 41, threaded spindle 8 is rotated in such a way that threaded nut 21 together with levers 28, 29 are moved to the right. As a consequence, blade 12 is opened until actuating element 45 of reversing switch 43 is introduced into recess 53 of control link 51 via the sloping side wall 55. In this operating position shown in FIG. 7, electric motor 5 is again stopped. Blades 11 and 12 of branch shears 1 assume the opened operating position.

Alternate operation of reversing switches 42 and 43 thus makes it possible to move threaded nut 21 to the left for complete or partial opening or to the right for complete or partial closing of branch shears 1 by electric motor 5. However, when control switch 41 is released, the branch shears 1 immediately open automatically. Accordingly, the operating position of branch shears 1 can thus be adapted without difficulty to the particular tasks to be accomplished or to the thickness of the branches to be cut off. Accidents and incorrect operation are thus avoided.

In the embodiment according to FIGS. 9 to 13, control switch 61 provided with reversing switches 62 and 63 is slideably inserted in a recess 66 of housing 2 of branch shears 1. Actuating elements 64 and 65 of reversing switches 62 and 63 interact alternately with a control link 71 which is formed as a skid 72 with bevels 73 and 74 on its ends. A spring 67 supported against housing 2 and acting on control switch 61 in a lengthwise direction serves to return control switch 61 automatically.

Figure 9:
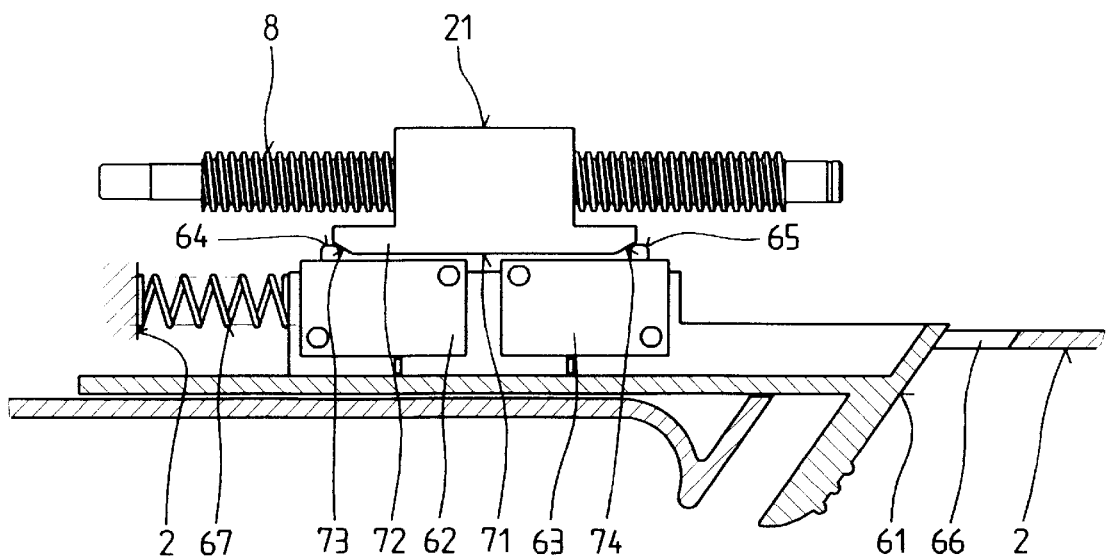
FIG. 9 shows a sliding control switch that can be used in the branch shears according to FIG. 1 in a simplified representation of a first switching position.
Figure 10:
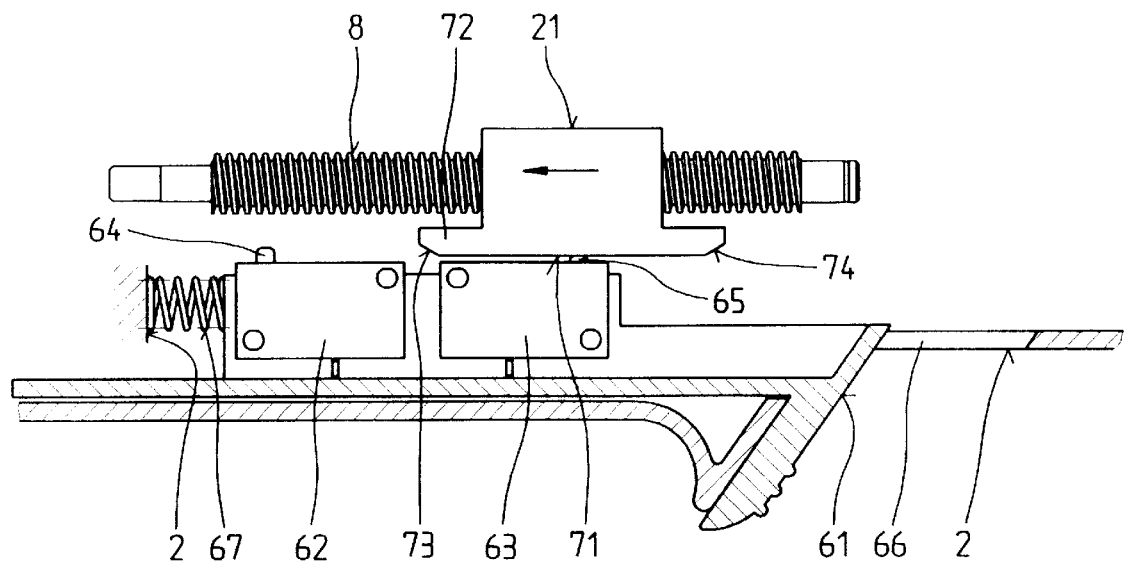
FIG. 10 shows the sliding control switch of FIG. 9 in a simplified representation of a second switching position.
Figure 11:
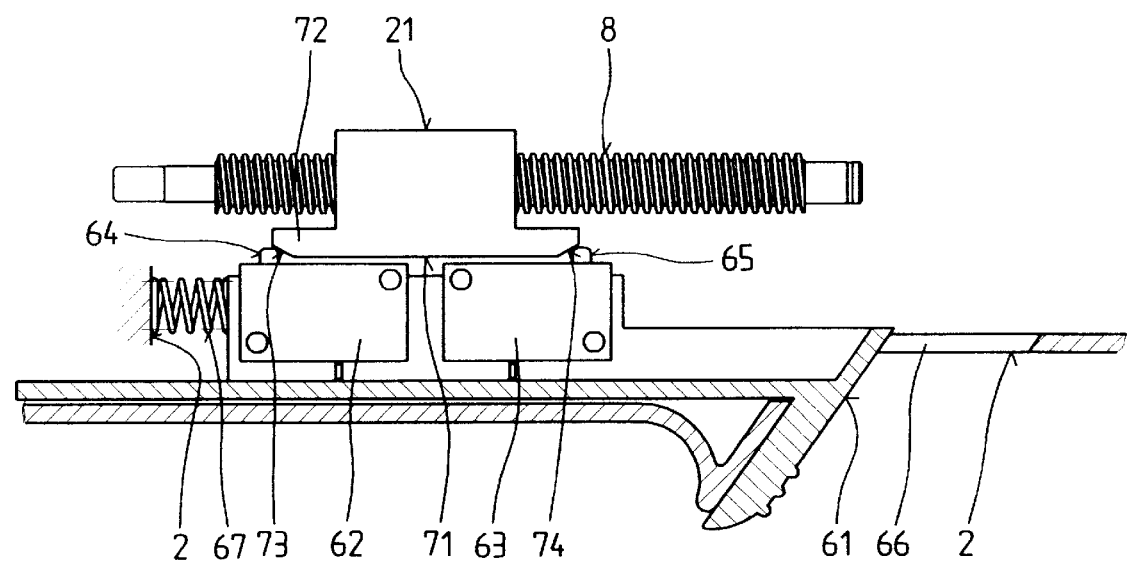
FIG. 11 shows the sliding control switch of FIG. 9 in a simplified representation of a third switching position.
Figure 12:
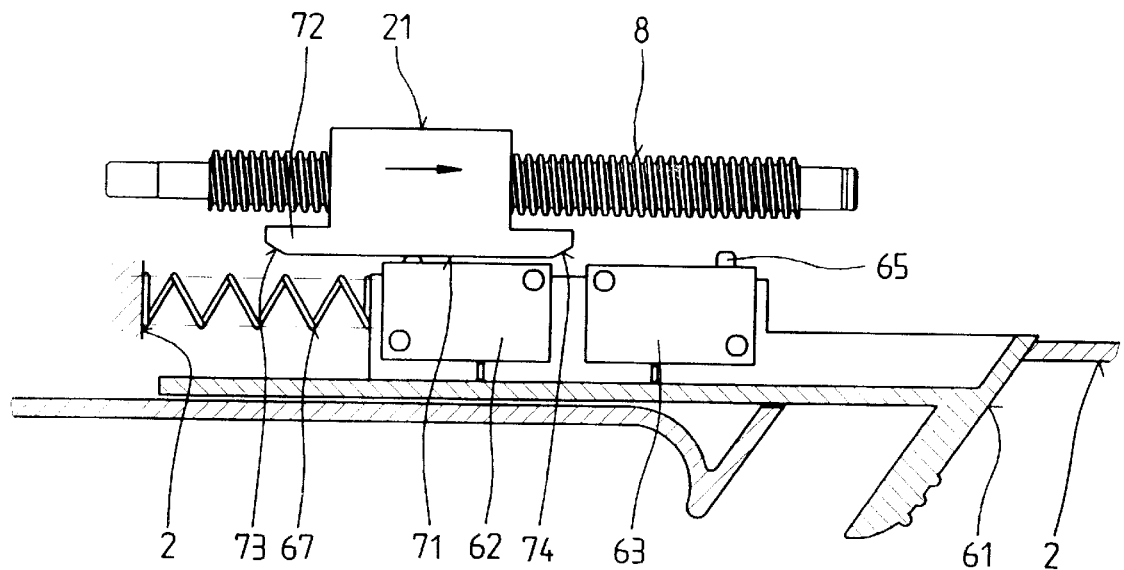
FIG. 12 shows the sliding control switch of FIG. 9 in a simplified representation of a fourth switching position.
Figure 13:
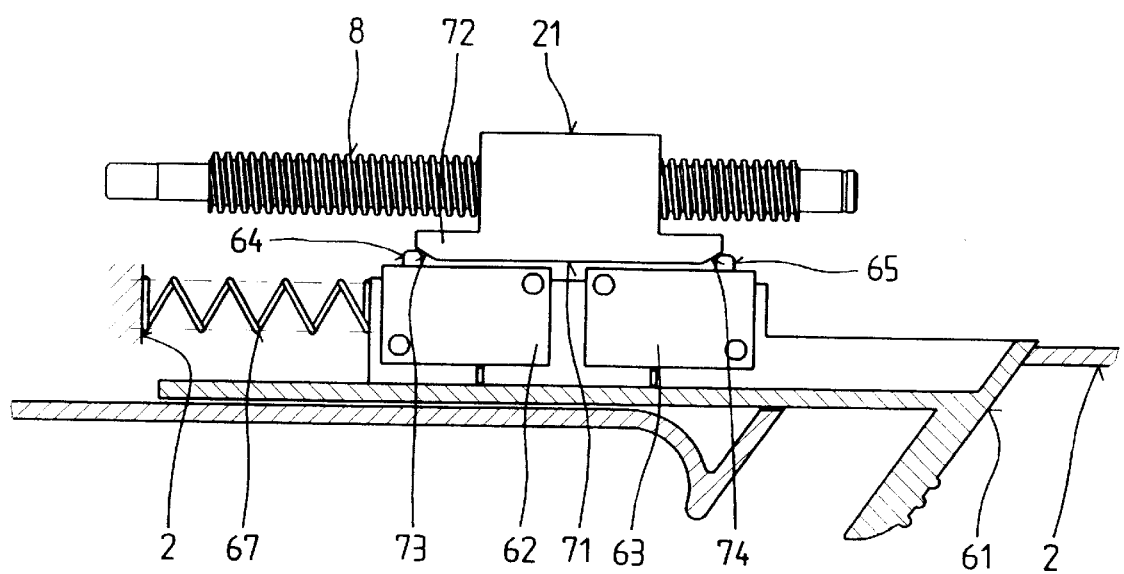
FIG. 13 shows the sliding control switch of FIG. 9 n a simplified representation of a fifth switching position.

A neutral position is again shown in FIG. 9. If control switch 61 is moved to the left in accordance with FIG. 10, reversing switch 63 is then actuated and threaded nut 21 is moved into the position shown in FIG. 11 in order to close branch shears 1. However, moving control switch 61 to the right, as can be seen in FIG. 12 causes electric motor 5 to be operated via reversing switch 62 in such a way that threaded nut 21 is moved by threaded spindle 8 to the right until it reaches the position shown in FIG. 13 and blades 11 and 12 of branch shears 1 are opened.

Of course, the movement of threaded nut 21 can be interrupted and the sequence of motion stopped or reversed with the aid of control switch 61 in this embodiment also. Also, spring 67 acting on control switch 61 ensures that the branch shears 1 are always opened automatically as soon as control switch 61 is released.

The invention is not to be taken as limited to all of the details thereof as modifications and variations thereof may be made without departing from the spirit of scope of the invention.

What is claimed is:

1. A branch shears tool (1) having:
    a first blade (11) and a second blade (12) movable in relation to each other;
    a housing (2) having the first blade (11) rigidly connected thereto;
    an electric motor (5) having a circuit and located in the housing;
    a threaded spindle rotatable by the electric motor and for moving the second blade;
    a threaded nut (21) arranged on the threaded spindle and supported so as to be non-rotating; and
    a rod assembly (28, 29) connected to the threaded nut; characterized by
    a control switch (41) capable of being actuated in the housing (2) and running perpendicular to the threaded spindle (8) for the controlled actuation of the electric motor (5), said control switch having a pair of reversing switches (42, 43) with actuating elements (44, 45) arranged at a lateral distance from each other and connected to the circuit of the electric motor (5);
    a control link (51) attached to the threaded nut (21); and
    a plurality of operating cams (53, 54, 55) formed on the control link and which interact with the actuating elements (44, 45) of the reversing switches (42, 43).

2. The tool of claim 1, further including a spring and characterized by the control switch (41) including a plurality of switching positions and being automatically movable into each of the plurality of switching positions against the force of the spring (47).

3. The tool of claim 1, characterized by the control link (51) that is attached to the threaded nut (21) being formed by a rail (52) projecting parallel to an axis of the threaded spindle, the rail having a recess (53) formed as one of the plurality of operating cams and which is open in a direction of actuation of the control switch (41) and has side walls (54, 55) sloping toward each other.

4. The tool of claim 3, characterized by the lateral distance between the two actuating elements (44, 45) of the reversing switches (42, 43) being greater than a length of the recess in the rail (52).

5. The tool of claim 3, further including a pin (46) carrying the control switch and characterized by the spring (47) acting on the control switch (41) being located at a distance from the pin (46) and being supported against the housing (2).

6. The tool of claim 4, further including a pin (46) carrying the control switch and characterized by the spring (47) acting on the control switch (41) being located at a distance from the pin (46) and being supported against the housing (2).

7. The tool of claim 1, further including a slide (49) and a stud (48) attached to the housing (2) and characterized by the control switch (41) being lockable into a switching position in which the blades (11, 12) are in a closed position by interaction of the slide (49) with the stud (48).

8. The tool of claim 1 characterized by the control switch (41) being actuated by rocking on a pin (46).

9. The tool of claim 5 characterized by the control switch (41) being free to rock about the pin (46).

10. The tool of claim 6 characterized by the control switch (41) being free to rock about the pin (46).

* * * * *